(No Model.)

R. BROWNSON.
MACHINE FOR STUFFING HORSE COLLARS.

No. 415,937. Patented Nov. 26, 1889.

Witnesses
Jos. S. Latimer
A. B. Browne

Inventor
Ralph Brownson
By Louis Leesworth
his Attorney.

UNITED STATES PATENT OFFICE.

RALPH BROWNSON, OF ST. PAUL, MINNESOTA, ASSIGNOR OF ONE-HALF TO W. A. HARDENBERGH, OF SAME PLACE.

MACHINE FOR STUFFING HORSE-COLLARS.

SPECIFICATION forming part of Letters Patent No. 415,937, dated November 26, 1889.

Application filed December 24, 1888. Serial No. 294,538. (No model.)

*To all whom it may concern:*

Be it known that I, RALPH BROWNSON, a citizen of the United States, residing at St. Paul, in the county of Ramsey and State of Minnesota, have invented an Improvement in Machines for Stuffing Horse-Collars; and I do hereby declare that the following is a full and exact description of the same, reference being had to the accompanying drawings, making part of this specification.

My improvement is adapted and applied to machines for stuffing short-cut straw or equivalent material into horse-collars by means of a reciprocating stuffing-rod operating in a tube or passage leading from a hopper or receptacle containing the cut straw in quantity; and my invention consists in a trough-like section or portion of the rod provided with cups opening forward, or with oblique partitions arranged to form forwardly-opening cups or straw-holders, whereby the straw is rapidly and uniformly fed from the hopper or receptacle through the tube or passage into the horse-collars, substantially as herein set forth.

Figure 1:
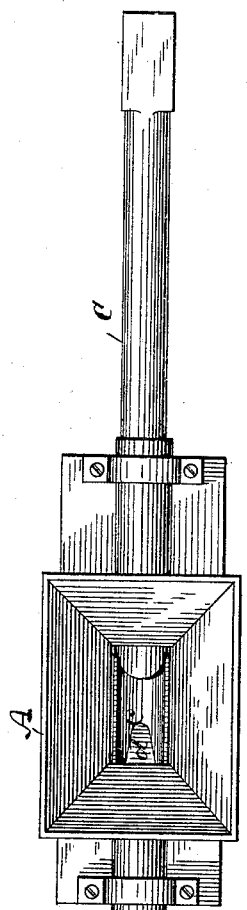
Figure 3:
Figure 2:
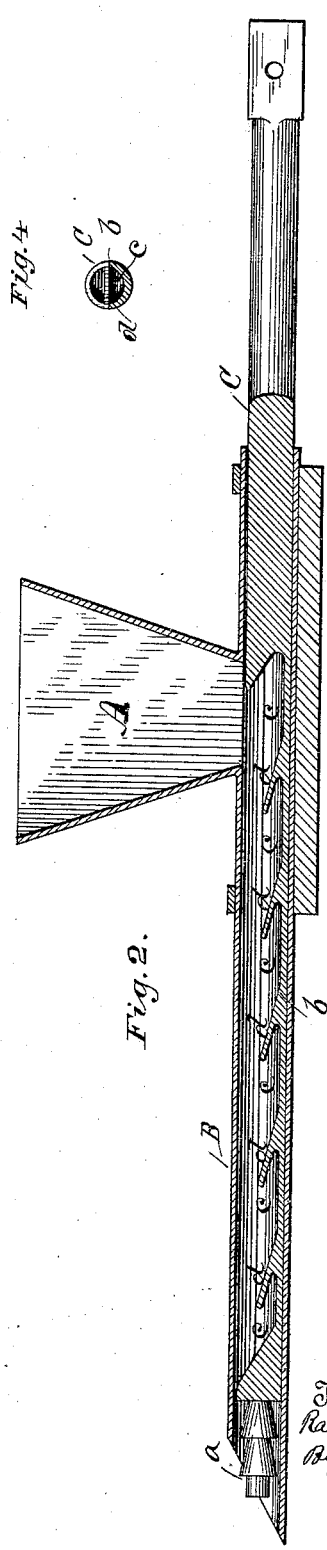
Figure 4:
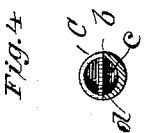

In the accompanying drawings, Figure 1 represents a top view of the essential parts of a horse-collar-stuffing machine organized as above set forth and provided with my improved stuffing-rod; Fig. 2, a central longitudinal vertical section of the same; Fig. 3, a side view of the improved stuffing-rod; Fig. 4, a cross-section of the trough-like portion of the same.

Like letters designate corresponding parts in all of the figures.

In the drawings, A represents the hopper or receptacle in which the cut straw is placed in quantity; B, the tube or passage through which the straw is conveyed or fed along from the hopper to the horse-collar, and C the stuffing-rod, by the reciprocating action of which the straw is fed along from the hopper through the tube and stuffed and packed into the horse-collar.

The stuffing-rod C receives its forward and backward reciprocating movement by any suitable and known means, which need not be here specified. Its stuffing or packing end $a$ has or may have the form shown. The section or portion $b$, which traverses the tube B, is made in trough-like form of any suitable shape, filling only a part of the diameter of the tube in which the stuffing-rod works, so as to allow sufficient space above it for the passage of the cut straw from one cup or division to another. I have shown the trough as being in the form of half a tube or concave cylinder, and this is a suitable and convenient form, the half-tube fitting freely in the tube B. This trough-like portion is provided with a succession of cups or cup-like cavities $c$ $c$, opening forward and having inclined sides $d$ $d$ reaching backward. The cups are conveniently formed by securing these inclined sides, in the form of thin partition-plates, in the trough by soldering or otherwise. With this construction the cups with mouths opening forward readily discharge their contents as the stuffing-rod goes forward and begins to start backward in its reciprocating motions, and the sides or partitions $d$ $d$, being inclined backward, to act as wedges to pass by the cut straw more or less filling the tube above them as the stuffing-rod goes backward, so that the straw is constantly being transferred from one cup to another farther forward as the stuffing-rod is reciprocated, and is repeatedly discharged into the collar from the outer cup by the reciprocations of the stuffing-rod. It is to be understood that at each backward movement of the stuffing-rod the rear cup enters the bottom of the hopper and repeatedly receives additional quantities of the straw from the same.

I claim as my invention—

In a machine for stuffing horse-collars, a tube and a hopper in communication therewith, in combination with a stuffing-rod reciprocating in said tube, said rod being concave or trough-shaped and open on its upper side, and having a series of forwardly-inclined partitions extending across the same, whereby a series of cup-shaped straw receiving and holding cavities are formed in said stuffing-rod, substantially as set forth.

In testimony whereof I have hereunto set my hand in presence of two subscribing witnesses.

RALPH BROWNSON.

Witnesses:
LOUIS FEESER, Jr.,
W. J. RODGERS.